US011291226B1

(12) United States Patent
Shah et al.

(10) Patent No.: US 11,291,226 B1
(45) Date of Patent: Apr. 5, 2022

(54) CRISPY PRESSED SNACKS WITH INCLUSIONS

(71) Applicant: THE HERESHEY COMPANY, Hershey, PA (US)

(72) Inventors: Utkarsh Shah, Hummelstown, PA (US); Emma Gottschall, Harrisburg, PA (US)

(73) Assignee: THE HERSHEY COMPANY, Hershey, PA (US)

( * ) Notice: Subject to any disclaimer, the term of this patent is extended or adjusted under 35 U.S.C. 154(b) by 606 days.

(21) Appl. No.: 16/155,024

(22) Filed: Oct. 9, 2018

Related U.S. Application Data

(60) Provisional application No. 62/569,731, filed on Oct. 9, 2017.

(51) Int. Cl.

| A23L 7/178 | (2016.01) |
|---|---|
| A23L 7/165 | (2016.01) |
| A23P 30/32 | (2016.01) |
| A23L 19/10 | (2016.01) |
| A23L 19/00 | (2016.01) |

(52) U.S. Cl.
CPC ............... *A23L 7/178* (2016.08); *A23L 7/165* (2016.08); *A23L 19/03* (2016.08); *A23L 19/10* (2016.08); *A23P 30/32* (2016.08)

(58) Field of Classification Search
None
See application file for complete search history.

(56) References Cited

U.S. PATENT DOCUMENTS

| 3,650,763 | A | 3/1972 | Touba |
|---|---|---|---|
| 3,800,050 | A | 3/1974 | Popel |
| 4,281,593 | A | 8/1981 | Gevaert |
| 4,888,180 | A | 12/1989 | Wu |
| 5,102,677 | A | 4/1992 | Van Den Berghe |
| 5,137,745 | A | 8/1992 | Zukerman et al. |
| 5,376,395 | A | 12/1994 | Pels |
| 5,562,021 | A | 10/1996 | Slanik |
| 5,817,355 | A | 10/1998 | Zukerman et al. |
| 5,871,793 | A | 2/1999 | Capodieci |
| 6,068,868 | A | 5/2000 | Capodieci |
| 6,248,379 | B1 | 6/2001 | Capodieci et al. |
| 6,569,481 | B1 | 5/2003 | Malfait |
| 6,632,465 | B1 | 10/2003 | Malfait |
| 6,676,983 | B2 | 1/2004 | Malfait |
| 6,805,888 | B2 | 10/2004 | Wu |
| 6,929,813 | B2 | 8/2005 | Malfait |
| 7,918,157 | B2 | 4/2011 | Van Den Berghe |
| 8,227,005 | B2 | 7/2012 | Van Poucke |
| 8,778,442 | B2 | 7/2014 | Khan et al. |
| 2008/0241332 | A1 | 10/2008 | Anand et al. |
| 2010/0285196 | A1 | 11/2010 | Moore et al. |
| 2013/0251877 | A1 | 9/2013 | Levin et al. |
| 2014/0322392 | A1 | 10/2014 | Haskins et al. |

FOREIGN PATENT DOCUMENTS

| BE | 906029 A2 | 6/1987 |
|---|---|---|
| BE | 1005598 A4 | 11/1993 |
| EP | 1741348 A1 | 1/2007 |
| WO | 8800797 A1 | 2/1998 |

OTHER PUBLICATIONS

"Kale Quinoa Chips", available at http://snackinnovations.com/products/snack-products/kale-quinoa-chips/, 3 pages, downloaded Aug. 30, 2017.

"Organic Thin Stackers—Red Rice & Quinoa", available at http://www.lundberg.com/product/thin-stackers-red-rice-quinoa/, 4 pages, downloaded Aug. 30, 2017.

"Kettle Popped Sweet & Salty Popcorn Chips", available at https://www.traderjoes.com/fearless-flyer/article/2197, 3 pages, downloaded Aug. 30, 2017.

"Pop Chips Multi-Grain Chips, Brown Rice Quinoa and Chia, 18 Ounce", available at https://www.amazon.com/Chips-Multi-Grain-Brown-Quinoa-Ounce/dp/B00IJ2FAM4, 4 pages, downloaded Aug. 30, 2017.

"Black Bean Tortilla Crisps", available at http://snackinnovations.com/products/snack-products/black-bean-tortilla-crisps/, 3 pages, downloaded Aug. 30, 2017.

"Crunchmaster Popped Edamame Chips", available at http://www.snackandbakery.com/articles/86688-crunchmaster-popped-edamame-chips, 2 pages, downloaded Aug. 30, 2017.

"Veggie Dippin' Chips", available at http://dippinchips.com/products/veggie/, 2 pages, downloaded Aug. 30, 2017.

"Sea salt veggie", available at http://popchips.com/products/sea-salt-veggie, 7 pages, downloaded Aug. 30, 2017.

"Garden Veggie Chips", available at https://www.sensibleportions.com/en/products/spssgveggiechips/, 3 pages, downloaded Aug. 30, 2017.

(Continued)

*Primary Examiner* — Jenna A Watts

(74) *Attorney, Agent, or Firm* — McNees Wallace & Nurick LLC

(57) ABSTRACT

A process of forming a crispy pressed snack includes combining at least one expandable plant product having a pre-gelled starch with a plurality of inclusions to form a mixture. The process also includes pressing the mixture together in a mold while applying heat at a temperature less than 220° C. to the mold to steam-cook the inclusions and cook the pre-gelled starch in the expandable plant product. The process further includes expanding the mold to reduce the pressure in the mold, thereby expanding the expandable plant product and forming the crispy pressed snack. A crispy pressed snack includes a mixture including an expanded plant product and pieces of at least one steamed low-starch vegetable. The steamed low-starch vegetable is present at about 10% to about 20%, by weight of the mixture. A starch of the expanded plant product holds the mixture together.

13 Claims, No Drawings

(56) References Cited

OTHER PUBLICATIONS

"Super Chips, Purple Corn With Sea Salt", available at http://www.dietsinreview.com/diet_column/food/?id=79490, 4 pages, downloaded Aug. 30, 2017.

"Spelt Right", available at https://www.speltright.com/our-products, 4 pages, downloaded Aug. 30, 2017.

CRISPY PRESSED SNACKS WITH INCLUSIONS

CROSS-REFERENCE TO RELATED APPLICATIONS

This application claims priority to and the benefit of U.S. Provisional Application No. 62/569,731 filed Oct. 9, 2017, which is hereby incorporated by reference in its entirety.

FIELD OF THE INVENTION

This application is directed to crispy pressed snacks. More specifically, this application is directed to crispy pressed snacks with inclusions.

BACKGROUND OF THE INVENTION

Certain grains are too small or too dense for use in a snack in a non-expanded form, and most fruits and vegetables are too fragile for inclusion in significant sizes in a conventional crispy pressed snack.

Cooking high-starch plant products under increased pressure (pressing) and then expanding under a reduced pressure produces a crispy pressed snack, such as a rice cake, with the starch aiding in keeping the pieces of rice stuck together in the rice cake. Rice cakes are conventionally formed in a mold to have a flat cylindrical shape. Other shapes, such as chips or crackers, may be formed using molds of other shapes. Similar crispy pressed snacks may be formed from other grains and from high-starch vegetables.

The temperature and time required for pressing and expanding depends on the high-starch plant product being used, but conventional temperatures are typically at least 240° C. (464° F.) and conventional times are typically less than 10 seconds.

Certain non-expandable inclusions may be mixed with the high-starch plant product prior to pressing and expanding to form inclusions in the crispy pressed snack. The time and temperature conditions to press and expand the high-starch plant product, however, limit the type, size, and amount of inclusions that may be combined with the high-starch plant product to produce an appetizing crispy pressed snack. Certain inclusions may burn or become otherwise unappetizing in the crispy pressed snack.

Another issue with crispy pressed snacks having higher inclusion levels is that the crispy pressed snack may be very crumbly and not retain its structure but instead fall apart after the pressing and expanding.

It would be desirable to provide a crispy pressed snack with a high level of healthy inclusions, such as fruits and low-starch vegetables, that are still easily visually identifiable in the crispy pressed snack.

BRIEF DESCRIPTION OF THE INVENTION

Exemplary embodiments are directed to crispy pressed snacks containing easily visually identifiable pieces of fruit or vegetable inclusions.

Exemplary embodiments are directed to crispy pressed snack formation processes with reduced temperatures during pressing and expanding compared to conventional pressed snack processes.

Some exemplary embodiments are directed to crispy pressed snacks that retain their structure and are not crumbly with inclusion levels in the range of about 10% to about 20% by weight.

Exemplary embodiments employ a pre-gelled starch pellet that permits reduction of the temperature for pressing and expanding an expandable plant product, thereby permitting a greater variation in type, size, and amount of inclusions that may be combined with an expandable plant product to form a crispy pressed snack.

Among the advantages of certain exemplary embodiments are visually identifiable inclusions in a crispy pressed snack, low-starch vegetable inclusions in a crispy pressed snack, high inclusion levels in a crispy pressed snack, and/or reduced pressing and expanding temperatures in producing a crispy pressed snack.

In an embodiment, a process of forming a crispy pressed snack includes combining at least one expandable plant product having a pre-gelled starch with a plurality of inclusions to form a mixture. The process also includes pressing the mixture together in a mold while applying heat at a temperature less than 220° C. to the mold to steam-cook the inclusions and cook the pre-gelled starch in the expandable plant product. The process further includes expanding the mold to reduce the pressure in the mold, thereby expanding the expandable plant product and forming the crispy pressed snack.

In another embodiment, a process of forming a crispy pressed snack includes combining pellets formed of at least one pre-gelled plant starch with a plurality of inclusions including at least one low-starch vegetable to form a mixture. The mixture is at least 60% by weight pre-gelled starch and about 10% to about 20% by weight of the inclusions. The pellets have a moisture content of about 10% to about 15% by weight. The process also includes pressing the mixture together in a mold and applying heat at a temperature less than 220° C. to the mold to steam-cook the low-starch vegetable and cook the expandable plant product. The process further includes expanding the mold to reduce the pressure in the mold, thereby expanding the expandable plant product and forming the crispy pressed snack.

In another embodiment, a crispy pressed snack includes a mixture including an expanded plant product and at least one steamed low-starch vegetable. The steamed low-starch vegetable is present at about 10% to about 20%, by weight of the mixture. A starch of the expanded plant product holds the mixture together. The pieces of steamed low-starch vegetable have a size and shape selected such that the steamed low-starch vegetable is visually identifiable in the crispy pressed snack.

Other features and advantages of the present invention will be apparent from the following more detailed description of exemplary embodiments that illustrate, by way of example, the principles of the invention.

DETAILED DESCRIPTION OF EXEMPLARY EMBODIMENTS

Use of one or more of a pre-gelatinized expandable plant product, a lower pressing and expanding temperature, and a fruit or low-starch vegetable inclusion enabled development of an appetizing crispy pressed snack.

A process of forming a crispy pressed snack includes pressing a mixture of at least one expandable plant product having a pre-gelled starch and inclusions of at least one fruit or low-starch vegetable in a mold. The fruit or vegetable has a size and shape selected such that the fruit or vegetable is visually identifiable in the crispy pressed snack. The process also includes applying heat at a temperature less than 220° C. (428° F.) to the mixture in the mold during the pressing to steam cook the vegetable and to cook the starch in the expandable plant product. The process further includes expanding the mold to reduce the pressure in the mold, thereby expanding the expandable plant product and forming the crispy pressed snack. In some embodiments, the pressing and expanding occur in an expansion apparatus.

By using pre-pelletized grains that include pre-gelled starch, that starch can be cooked at lower temperatures (less than 220° C.) than used in conventional pressed cake snack manufacture. The lower temperatures in turn allow the inclusion of fruits or vegetables at sizes that can be easily recognized and visually identified by consumers without the risk of those inclusions burning during the pressing and expanding processes, which would render them otherwise unpalatable.

A crispy pressed snack includes at least one expandable plant product in an expanded state and inclusions of at least one fruit or steamed low-starch vegetable.

In some embodiments, the expandable plant product is a high-starch plant product. In some embodiments, the expandable plant product has at least 60% pre-gelled starch by weight. Appropriate expandable plant products may include, but are not limited to, grains and non-grain, high-starch plant products. In some embodiments, the grains are ancient grains.

As used herein, "ancient grains" refers to grains and pseudocereals that have been minimally changed by humans by selective breeding. Ancient grains may include, but are not limited to, amaranth, barley, buckwheat, bulgur, chia, einkorn, emmer, farro, freekeh, kamut, oats, quinoa, sorghum, spelt, teff, and combinations thereof.

Other appropriate grains may include, but are not limited to, corn, rice, wheat, and combinations thereof. These grains have a higher starch content than ancient grains, which may permit higher percentages of inclusions in a crispy pressed snack that stays together rather than falling apart after pressing and expanding.

Appropriate non-grain, high-starch plant products may include, but are not limited to, potatoes, sweet potatoes, lentils, and combinations thereof.

In some embodiments, the expandable plant product is included as a whole grain. In some embodiments, the expandable plant products in the crispy pressed snack are 100% whole grains.

In some embodiments, the expandable plant product is provided in the form of extruded pellets or otherwise in a form in which the expandable plant product starch has been pre-gelatinized. Pre-gelatinizing the starch in the expandable plant product reduces the temperature needed to press, cook, and expand the expandable plant product after being combined with the inclusions. It will be appreciated that in some embodiments whole grains or other expandable plant products may be used in combination with the pre-gelatinized pellets.

In some embodiments, a pre-gelatinized pellet is formed by extruding a pellet composition at a temperature and pressure sufficiently high to pre-gelatinize the starch in the pellet composition. The pre-gelatinized pellet may have a thickness in the range of about 1 mm to about 5 mm (about 0.04 in to about 0.2 in). Appropriate pellet compositions may include, but are not limited to, mixtures of one or more flours of one or more ancient grains, one or more flours of another appropriate grain, or one or more flours of another appropriate expandable plant product. Appropriate pre-gelatinized pellets have a moisture content, by weight, of about 10% to about 16%, alternatively about 11% to about 14%, alternatively about 11% to about 13%, alternatively about 13% to about 16% alternatively about 12% to about 13%, or any value, range, or sub-range therebetween.

In some embodiments, the pre-gelatinized pellets are added to achieve a pre-gelled starch content that is at least 60% by weight of the pellet/inclusion mixture prior to pressing and expanding. In some embodiments, the pre-gelled starch content is in the range of about 60% to about 80% by weight. The pre-gelatinized pellets are mainly, but not entirely, starch, as at least some fiber content is also typically present.

In other embodiments, a portion of the starch content may be in a non-pre-gelled state or may be provided by the inclusions. In such embodiments, the total starch content is preferably at least 60% by weight, but the pre-gelled starch content may be less than 60% by weight. In such embodiments, the pre-gelled starch content may be in the range of 50% to 60% by weight.

In some embodiments, the inclusions are low in starch and low in natural sugars, such as low in glucose and low in fructose, and further not readily expandable. In some embodiments, the inclusions are pieces of a low-starch vegetable. The low-starch vegetable is preferably steam-cookable. Appropriate low-starch vegetables in a dehydrated state may have, by weight, less than 40% starch, alternatively less than 30% starch, alternatively less than 20% starch, alternatively less than 10% starch, alternatively less than 5% starch, alternatively less than 1% starch, or any value, range, or sub-range therebetween. In some embodiments, the pieces of vegetable are of a size and shape so as to be visually identifiable in the crispy pressed snack as that vegetable. In some embodiments, a visually-identifiable piece of vegetable inclusion has a longest dimension of at least 10 mm (0.039 in).

Appropriate steamable low-starch vegetables may include, but are not limited to, alfalfa sprouts, arugula, artichoke, asparagus, bamboo shoots, basil, bean sprouts, beets, beet greens, bell peppers, bok choy, broccoli, Brussels sprouts, cabbage, carrots, cauliflower, celery, chayote, chicory, Chinese cabbage, Chinese spinach, cilantro, collard greens, cucumber, dandelion greens, eggplant, endive, escarole, fennel, garlic, greens, green beans, green onions, green peppers, heart of palm, hot peppers, iceberg lettuce, Italian beans, jicama, kale, kohlrabi, leeks, lettuce, mushrooms, mustard greens, okra, onions, parsley, purslane, radishes, rapini, rhubarb, romaine lettuce, rosemary, rutabaga, scallions, shallots, snow peas, spinach, summer squash, Swiss chard, thyme, tomatillos, tomatoes, turnips, turnip greens, water chestnuts, watercress, wax beans, yellow beans, zucchini, and combinations thereof.

In some embodiments, the inclusions are present, by weight of the mixture prior to pressing and expanding, in an amount of up to about 20%, alternatively about 10% to about 20%, alternatively about 15% to about 20%, alternatively about 18% to about 20%, alternatively about 10% to about 15%, alternatively about 13% to about 17%, or any value, range, or sub-range therebetween. It will be appreciated that in a preferred embodiment, it is desirable to maximize the vegetable inclusions in the crispy pressed snacks; however, if inclusions exceed 20% by weight, the snack is fragile and does not form. That is, exceeding 20% by weight inclusions reduces the starch content to levels that prevents holding the snack together in the desired shape.

In some embodiments, the inclusions have a moisture content in the range of about 2% to about 10%, alternatively about 3% to about 7%, alternatively about 3% to about 5%, alternatively about 4%, or any value, range, or sub-range therebetween, by weight at the time of being introduced to the expansion apparatus. Thus, depending on the natural moisture content of the inclusion material, the inclusion material may be partially dehydrated or water may be added to achieve a predetermined moisture content prior to combining with the expandable plant product.

In some embodiments, the inclusion are pieces of fruit. In some embodiments, the fruit is a dried fruit. In some embodiments, the fruit inclusions are present, by weight of the mixture prior to pressing and expanding, in an amount of up to about 10%, alternatively about 3% to about 10%, alternatively about 3% to about 5%, alternatively about 4% to about 6%, alternatively about 5% to about 10%, alternatively about 6% to about 8%, alternatively about 8% to about 10%, or any value, range, or sub-range therebetween. In some embodiments, the fruit inclusions have a moisture content in the range of about 2% to about 10%, alternatively about 3% to about 7%, alternatively about 2% to about 5%, alternatively about 5% to about 10%, or any value, range, or sub-range therebetween, by weight at the time of being introduced to the expansion apparatus. Appropriate fruit inclusions may include, but are not limited to, apple, apricot, avocado, banana, blackberry, blackcurrant, blueberry, boysenberry, currant, cherry, cococnut, cranberry, date, dragonfruit, elderberry, fig, goji berry, grape (raisin), grapefruit, kiwi, kumquat, lemon, lime, lychee, mango, melons (cantaloupe, honeydew, watermelon), nectarine, olive, oranges, papaya, passionfruit, peach, pear, persimmon, plantain, plum (prune), pineapple, plumcot, pomelo, raspberry, redcurrant, starfruit, strawberry, tamarind, yuzu, and combinations thereof.

The pressing and expanding of a mixture, which includes the expandable plant product and the low-starch vegetable, may occur in an expansion apparatus, such as, for example, a rice cake machine. Appropriate expansion apparatus may include, but are not limited to, a popping apparatus, a Pellex® grain processor (Incomec Cerex, Brakel, Belgium), an SYP rice cake machine (Shinyoung Mechanics Co., Ltd., Bucheon, South Korea), or a Mini-Pop machine (Delice Co., Ltd., Seongnam, South Korea).

In some embodiments, a mixture including the expandable plant product and the low-starch vegetable is fed through a hopper of an expansion apparatus. The expansion apparatus volumetrically meters the mixture and provides the metered mixture to a mold by way of a feed slide. The mold may include heated upper and lower parts and a pneumatically-driven ring. The expansion apparatus closes the mold for a first period of time, compressing the mixture, cooking the pre-gelled starch in the expandable plant product, and steam-cooking the low-starch vegetable. The apparatus then expands the mold to create a small opening, which enables the expandable plant product to expand, thereby forming the crispy pressed snack. The expansion apparatus then ejects the crispy pressed snack from the mold to a conveyor, which transports the crispy pressed snack to a flavoring area and/or a packaging area.

The heat applied to the mixture provides a maximum temperature less than 220° C. (428° F.), alternatively less than 215° C. (419° F.), alternatively about 210° C. (410° F.) or less, to steam-cook the at least one vegetable and cook the pre-gelled starch. In some embodiments, the heat applied to the mixture provides a maximum temperature in the range of about 205° C. to about 215° C. (about 401° F. to about 419° F.), alternatively in the range of about 208° C. to about 212° C. (about 406° F. to about 414° F.), alternatively about 210° C. (410° F.), or any value, range, or sub-range therebetween, to steam-cook the low-starch vegetable and cook and expand the pre-gelled starch of the expandable plant product.

The use of a temperature below 220° C. (428° F.) and a pre-gelled starch permits a wider range of pressing and expanding times that are capable of producing an appetizing crispy pressed snack. The heat may be applied to the mixture for a time period in the range of about 4 seconds to about 10 seconds, alternatively about 5 seconds to about 7 seconds, alternatively about 6 seconds, or any value, range, or sub-range therebetween. The expanded plant product is present in the crispy pressed snack in an amount of about 70% to about 90% of the mixture of expanded plant product and inclusions of the crispy pressed snack. The starch of the expanded plant product holds the mixture of expanded plant product and inclusions together in the crispy pressed snack.

In some embodiments, the crispy pressed snack has a water content, by weight, after the pressing and expanding, of about 3% to about 6%, alternatively about 3% to about 4%, alternatively about 4% to about 5%, alternatively about 5% to about 6%, or any value, range, or sub-range therebetween. In some embodiments, the crispy pressed snack is produced to have a thickness dimension in the range of about 1 mm to about 18 mm (about 0.04 in. to about 0.7 in.).

In some embodiments, the crispy pressed snack further includes at least one sweetener. In some embodiments, the sweetener is a natural sweetener. Appropriate natural sweeteners may include, but are not limited to, brown sugar, cinnamon, agave, honey, and combinations thereof. Any significant amount of added sweetener that includes a significant amount of one or more sugars, however, is preferably added after expanding the expandable plant product. Sugars may burn under the pressing and expanding conditions, so a low sugar content for the mixture to be pressed and expanded is preferable. For these reasons, the inclusions preferably have a low sugar content as well.

In some embodiments, the crispy pressed snack includes at least one flavoring. Appropriate flavorings may include, but are not limited to, salt, black pepper, garlic powder, onion powder, lemon, taco seasoning, tomato basil, and combinations thereof. The flavoring may be included in the mixture or applied to the crispy pressed snack after pressing and expanding.

In some embodiments, the crispy pressed snack provides at least half a serving of vegetables in a 30-gram reference amount customarily consumed (RACC). When the vegetable is a leafy green, the crispy pressed snack provides at least one serving of vegetables in a 30-gram RACC. In some embodiments, the crispy pressed snack provides at least two servings of vegetables in a 30-gram RACC. In some embodiments, the crispy pressed snack is free of genetically-modified organisms (non-GMO) and/or is gluten-free. In some embodiments, the crispy pressed snack is a good to excellent source of fiber and/or a good source of protein. In some embodiments, the crispy pressed snack includes no sugar binders. In some embodiments, the crispy pressed snack has a clean label, containing no artificial ingredients or synthetic chemicals.

EXAMPLES

The invention is further described in the context of the following examples which are presented by way of illustration, not of limitation.

Inventive Example 1

A mixture of 50% by weight of pre-gelled brown rice pellets, 30% by weight of pre-gelled kale/lentil pellets, and 20% by weight of broccoli, as inclusions of a low-starch vegetable, was pressed and expanded in an SYP 4506 Rice Cake Machine at a temperature of about 210° C. (410° F.). The moisture content of the pre-gelled brown rice pellets was about 12% by weight and the moisture content of the broccoli was about 4% by weight prior to pressing and expanding. The pressing and expanding time was about 6 seconds.

The low-starch vegetable in the crispy pressed snack was not scorched or burned. The crispy pressed snack did not fall apart, and the original color and flavor of the low-starch vegetable was well preserved in the crispy pressed snack.

Inventive Example 2

A mixture of 80% by weight of pre-gelled kale/lentil pellets and 20% by weight of inclusions (10% beet powder, 5% kale, and 5% spinach as the low-starch vegetables) was pressed and expanded in an SYP 4506 Rice Cake Machine at a temperature of about 210° C. (410° F.). The moisture content of the kale and the spinach was each about 4% by weight prior to pressing and expanding. The pressing and expanding time was about 6 seconds.

The low-starch vegetables in the crispy pressed snack were not scorched or burned. The crispy pressed snack did not fall apart, and the original color and flavor of the low-starch vegetables was well preserved in the crispy pressed snack.

Inventive Example 3

A mixture of 80% by weight of pre-gelled kale/lentil pellets and 20% by weight of inclusions (10% broccoli and 10% spinach as the low-starch vegetables) was pressed and expanded in an SYP 4506 Rice Cake Machine at a temperature of about 210° C. (410° F.). The moisture content of the broccoli and the spinach was each about 4% by weight prior to pressing and expanding. The pressing and expanding time was about 6 seconds.

The low-starch vegetables in the crispy pressed snack were not scorched or burned. The crispy pressed snack did not fall apart, and the original color and flavor of the low-starch vegetables was well preserved in the crispy pressed snack.

Inventive Example 4

A mixture of 70% by weight of pre-gelled brown rice pellets, 10% by weight sweet potato pellets, and 20% by weight of inclusions (10% beet chips and 10% kale as the low-starch vegetables) was pressed and expanded in an SYP 4506 Rice Cake Machine at a temperature of about 210° C. (410° F.). The moisture content of the brown rice pellets was about 12%, the moisture content of the sweet potato pellets was about 12.5%, the moisture content of the beet chips was about 3%, and the moisture content of the kale was about 4% by weight prior to pressing and expanding. The pressing and expanding time was about 6 seconds.

The low-starch vegetables in the crispy pressed snack were not scorched or burned. The crispy pressed snack did not fall apart, and the original color and flavor of the low-starch vegetables was well preserved in the crispy pressed snack.

Inventive Example 5

A mixture of 90% by weight of pre-gelled white rice pellets and 10% by weight of inclusions (dried pineapple as the dried fruit) was pressed and expanded in a Mini-pop machine at a temperature of about 210° C. (410° F.). The moisture content of the rice pellets was between about 13% and about 16%, and the moisture content of the dried pineapple was less than about 5% by weight prior to pressing and expanding. The pressing and expanding time was about 6 seconds.

Inventive Example 6

A mixture of 95% by weight of pre-gelled white rice pellets and 5% by weight of inclusions (dried mango as the dried fruit) was pressed and expanded in a Mini-pop machine at a temperature of about 210° C. (410° F.). The moisture content of the white rice pellets was between about 13% and about 16%, and the moisture content of the dried mango was less than about 5% by weight prior to pressing and expanding. The pressing and expanding time was about 6 seconds.

Inventive Example 7

A mixture of 95% by weight of pre-gelled white rice pellets and 4% by weight of inclusions (2% dried strawberry and 2% banana as the dried fruits) was pressed and expanded in a Mini-pop machine at a temperature of about 210° C. (410° F.). The moisture content of the white rice pellets was between about 13% and about 16%, and the moisture content of the dried strawberry and dried banana was less than about 5% by weight prior to pressing and expanding. The pressing and expanding time was about 6 seconds.

Inventive Example 8

A mixture of 90% by weight of pre-gelled brown rice pellets and 10% by weight of dried jalapeno pepper as inclusions was pressed and expanded in a Mini-pop machine at a temperature of about 210° C. (410° F.). The moisture content of the brown rice pellets was between about 13% and about 14%, and the moisture content of the dried jalapeno's was less than about 6% by weight prior to pressing and expanding. The pressing and expanding time was about 6 seconds.

Various additional examples of crispy pressed snacks with inclusions were successfully formed using amaranth, organic quinoa, lentils, long grain brown rice, sorghum, buckwheat, purple corn, yellow corn, brown rice pellets, kale/lentil pellets, and sweet potato pellets as at least part of the expandable plant product.

Likewise, various additional examples of crispy pressed snacks with inclusions were successfully formed using carrots, onions, red pepper, and tomatoes as inclusions.

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A process of forming a crispy pressed snack, the process comprising:

combining at least one expandable plant product having a pre-gelled starch with a plurality of inclusions of at least one low-starch vegetable to form a mixture, the pre-gelled starch being present in an amount of at least 60% by weight and the inclusions being present in an amount of about 10% to about 20% by weight in the mixture;

pressing the mixture together in a mold while applying heat at a temperature of about 208° C. to about 212° C. to the mold to steam-cook the inclusions and cook the pre-gelled starch in the expandable plant product; and expanding the mold to reduce the pressure in the mold, thereby expanding the expandable plant product to form the crispy pressed snack.

2. The process of claim 1, wherein the plurality of inclusions have a size and shape selected such that the low-starch vegetable is visually identifiable in the crispy pressed snack.

3. The process of claim 2, wherein in the step of combining, the inclusions are present in an amount of about 15% to about 20% by weight in the mixture.

4. The process of claim 1, wherein the step of combining includes providing the expandable plant product having a moisture content of about 10% to about 16% by weight.

5. The process of claim 1, wherein the step of pressing is for a period of time of about 4 seconds to about 10 seconds.

6. A process of forming a crispy pressed snack, the process comprising:

combining pellets formed of at least one pre-gelled plant starch with a plurality of inclusions of at least one low-starch vegetable to form a mixture, wherein the mixture is at least 60% by weight pre-gelled plant starch and about 15% to about 20% by weight inclusions, the pellets having a moisture content of about 10% to about 15% by weight of the pellets;

pressing the mixture together in a mold and applying heat at a temperature of about 208° C. to about 212° C. to the mold for about 5 to about 7 seconds to steam-cook the low-starch vegetable and cook the pre-gelled plant starch; and expanding the mold to reduce the pressure in the mold, thereby expanding the pre-gelled plant starch to form the crispy pressed snack.

7. The process of claim 6, wherein the low-starch vegetable has a size and shape selected such that the low-starch vegetable is visually identifiable in the crispy pressed snack.

8. The process of claim 6, wherein the step of combining includes providing the pre-gelled plant starch having a moisture content of about 10% to about 16% by weight.

9. The process of claim 6, wherein the plurality of inclusions has a moisture content of about 2% to about 10% by weight.

10. The process of claim 1, wherein the at least one expandable plant product is selected from the group consisting of amaranth, barley, buckwheat, bulgur, chia, einkorn, emmer, farro, freekeh, kamut, oats, quinoa, sorghum, spelt, teff, corn, rice, wheat, potatoes, sweet potatoes, lentils, and combinations thereof.

11. The process of claim 6, wherein the steamed low-starch vegetable is selected from the group consisting of alfalfa sprouts, arugula, artichoke, asparagus, bamboo shoots, basil, bean sprouts, beets, beet greens, bell peppers, bok choy, broccoli, Brussels sprouts, cabbage, carrots, cauliflower, celery, chayote, chicory, Chinese cabbage, Chinese spinach, cilantro, collard greens, cucumber, dandelion greens, eggplant, endive, escarole, fennel, garlic, greens, green beans, green onions, green peppers, heart of palm, hot peppers, iceberg lettuce, Italian beans, jicama, kale, kohlrabi, leeks, lettuce, mushrooms, mustard greens, okra, onions, parsley, purslane, radishes, rapini, rhubarb, romaine lettuce, rosemary, rutabaga, scallions, shallots, snow peas, spinach, summer squash, Swiss chard, thyme, tomatillos, tomatoes, turnips, turnip greens, water chestnuts, watercress, wax beans, yellow beans, zucchini, and combinations thereof.

12. The process of claim 6, wherein the crispy pressed snack has a water content of about 3% to about 6%, by weight of the mixture.

13. The process of claim 1, wherein the pressing is for about 5 to about 7 seconds.

* * * * *